United States Patent
Seel

(10) Patent No.: US 9,908,521 B2
(45) Date of Patent: Mar. 6, 2018

(54) METHOD FOR REGULATING ROTATIONAL SPEED

(75) Inventor: Andreas Seel, Bonn (DE)

(73) Assignee: ROBERT BOSCH GMBH, Stuttgart (DE)

(*) Notice: Subject to any disclaimer, the term of this patent is extended or adjusted under 35 U.S.C. 154(b) by 869 days.

(21) Appl. No.: 13/130,500

(22) PCT Filed: Oct. 16, 2009

(86) PCT No.: PCT/EP2009/063557
§ 371 (c)(1),
(2), (4) Date: Aug. 26, 2011

(87) PCT Pub. No.: WO2010/057727
PCT Pub. Date: May 27, 2010

(65) Prior Publication Data
US 2011/0301798 A1   Dec. 8, 2011

(30) Foreign Application Priority Data
Nov. 21, 2008 (DE) .................. 10 2008 043 980

(51) Int. Cl.
*B60K 6/48* (2007.10)
*B60W 20/11* (2016.01)
(Continued)

(52) U.S. Cl.
CPC .............. *B60W 20/11* (2016.01); *B60K 6/48* (2013.01); *B60W 10/08* (2013.01); *B60W 30/20* (2013.01);
(Continued)

(58) Field of Classification Search
CPC ...... B60W 10/08; B60W 10/06; B60W 20/11; B60W 10/02; B60W 20/00; B60W 20/10;
(Continued)

(56) References Cited

U.S. PATENT DOCUMENTS 5,031,597 A * 7/1991 Monden ............... F02D 41/047
                                                     123/492
6,018,198 A * 1/2000 Tsuzuki et al. ................ 290/17
(Continued)

FOREIGN PATENT DOCUMENTS

DE    10 2006 010233    9/2007
DE    10 2007 016513    10/2008
(Continued)

OTHER PUBLICATIONS

International Search Report for PCT/EP2009/063557, dated Jan. 28, 2010.

*Primary Examiner* — Behrang Badii
(74) *Attorney, Agent, or Firm* — Norton Rose Fulbright US LLP; Gerard Messina

(57) ABSTRACT

A method is provided for regulating the rotational speed in a hybrid drive of a vehicle having a first drive source, in particular an internal combustion engine, and a second drive source, in particular an electric motor. A rotational speed variable which is a function of a rotational speed of the first drive source and of a rotational speed of the second drive source is determined. The rotational speed of the first drive source or of the second drive source is regulated based on the rotational speed variable for oscillation reduction. The rotational speed variable used is preferably a mean value of the two rotational speeds. The two rotational speeds may be weighted on the basis of inertia in order to form the mean value as well.

25 Claims, 5 Drawing Sheets

(51) Int. Cl.
*B60W 30/20* (2006.01)
*B60W 10/08* (2006.01)
*B60L 11/12* (2006.01)
*B60K 6/442* (2007.10)
*B60K 6/485* (2007.10)
*F02D 41/04* (2006.01)
*B60K 6/00* (2006.01)
*B60K 6/365* (2007.10)
*B60K 6/383* (2007.10)
*B60W 20/00* (2016.01)

(52) U.S. Cl.
CPC ............... *B60K 6/00* (2013.01); *B60K 6/365* (2013.01); *B60K 6/383* (2013.01); *B60K 6/442* (2013.01); *B60K 6/485* (2013.01); *B60L 11/12* (2013.01); *B60L 2240/421* (2013.01); *B60L 2240/441* (2013.01); *B60W 20/00* (2013.01); *B60W 2510/0638* (2013.01); *B60W 2510/0695* (2013.01); *B60W 2510/081* (2013.01); *B60W 2710/0644* (2013.01); *B60W 2710/081* (2013.01); *F02D 41/04* (2013.01); *F02D 41/047* (2013.01); *Y02T 10/6221* (2013.01); *Y02T 10/642* (2013.01)

(58) Field of Classification Search
CPC ........ B60L 11/12; B60L 11/02; B60L 11/123; B60L 11/14; B60L 15/20; B60K 6/442; B60K 6/00; B60K 6/365; B60K 6/04; B60K 6/485; B60K 6/543; B60K 6/383; B60K 6/387; B60K 6/48; B60K 6/54; F02D 41/04; F02D 41/047
USPC ........................................................ 701/22
See application file for complete search history.

(56) References Cited

U.S. PATENT DOCUMENTS

| | | | | |
|---|---|---|---|---|
| 6,175,785 | B1* | 1/2001 | Fujisawa ............... | B60K 6/442 192/103 R |
| 6,340,339 | B1* | 1/2002 | Tabata et al. ................. | 475/5 |
| 6,411,879 | B2* | 6/2002 | Kupper et al. ................. | 701/51 |
| 6,479,906 | B2* | 11/2002 | Uchida ..................... | 290/40 C |
| 6,483,197 | B1* | 11/2002 | Masberg et al. ............ | 290/40 C |
| 6,506,139 | B2* | 1/2003 | Hirt et al. ........................ | 477/3 |
| 6,629,024 | B2* | 9/2003 | Tabata et al. ................... | 701/22 |
| 7,488,272 | B2* | 2/2009 | Bothe ................... | B60W 10/06 477/175 |
| 2001/0020789 | A1* | 9/2001 | Nakashima ............ | B60K 6/365 290/40 C |
| 2006/0276287 | A1* | 12/2006 | Lang ..................... | B60K 6/365 475/5 |
| 2007/0095587 | A1* | 5/2007 | DuCharme .............. | B60K 6/12 180/65.31 |
| 2007/0113546 | A1* | 5/2007 | Jankovic ........................ | 60/287 |
| 2007/0191186 | A1* | 8/2007 | Bothe .................... | B60W 10/06 477/175 |
| 2008/0236916 | A1* | 10/2008 | Heller ..................... | B60K 6/46 180/65.265 |

FOREIGN PATENT DOCUMENTS

EP 0 965 475 12/1999
EP 1 439 087 7/2004

* cited by examiner

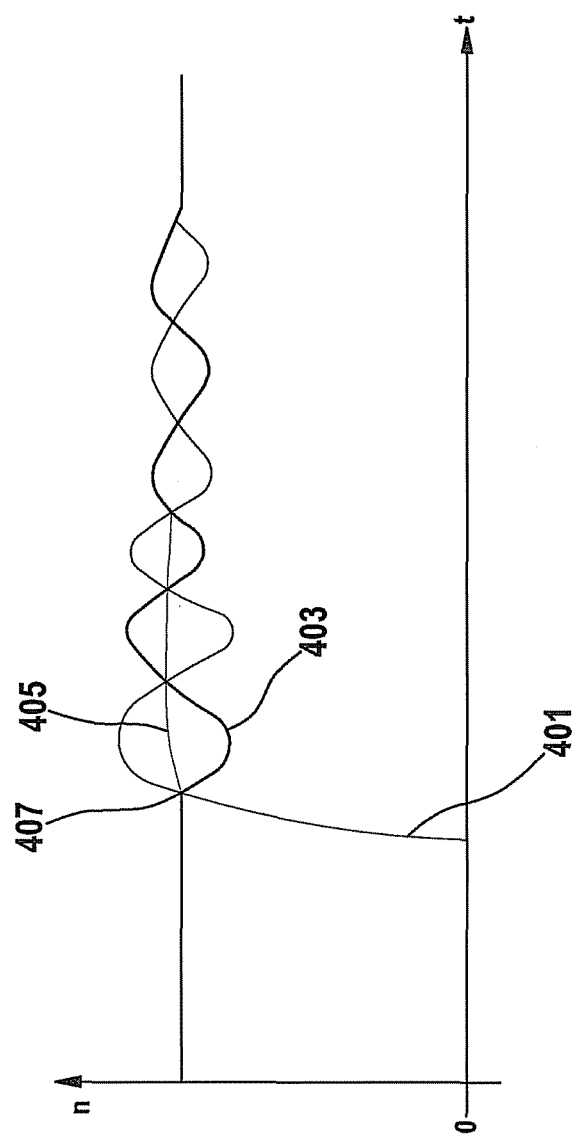

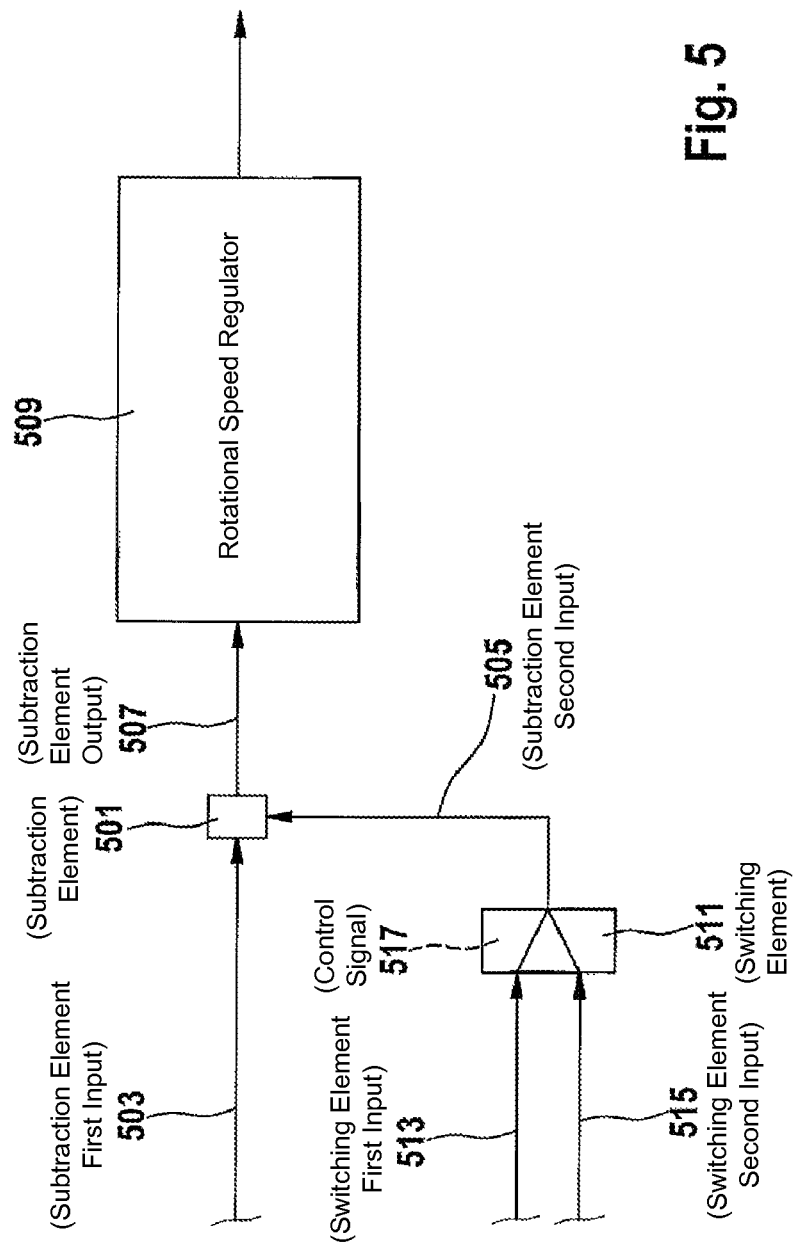

METHOD FOR REGULATING ROTATIONAL SPEED

FIELD OF THE INVENTION

The present invention relates to regulating rotational speed in a hybrid drive.

BACKGROUND

In conventional vehicle drives having only an internal combustion engine, for regulating the rotational speed, device controls are used which, after the internal combustion engine is started, regulate its rotational speed based on a difference between a setpoint rotational speed and an actual rotational speed, as described in the document DE 600 15 820 T2, for example. However, such rotational speed regulation is not suitable for compensating for rotational speed oscillations which occur due to rotational speeds that change in rapid succession when an internal combustion engine is engaged with a hybrid drive.

FIG. 1 shows an example of a drive train of a hybrid vehicle having an internal combustion engine 101 which is coupleable to an electric motor with the aid of a separating clutch 103. The drive train also includes a torque converter 107 situated downstream from electric motor 105, and distributor gearing 109. For damping rotary vibration, separating clutch 103 usually includes one or multiple bow springs which are compressed when separating clutch 103 rapidly engages for starting internal combustion engine 101. This causes excitation of rotary vibration between, internal combustion engine 101 and electric motor 105, which may adversely affect the rotational speed regulation due to strong torque deflections of a rotational speed regulator. In addition, these oscillations have a frequency which, due to the drive inertia, among other factors, is too high to allow efficient compensation for the rotary vibrations, so that the above-mentioned torque deflections of the rotational speed regulator may have a particularly intense effect.

FIG. 2 shows an example of a curve of the rotational speed oscillations which arise when separating clutch 103 is engaged at point in time 201. Curve 203 illustrates a rotational speed curve of the internal combustion engine, while curve 205 shows a rotational speed of the electric motor. In FIG. 2 it is clearly apparent that the rotational speed of electric motor 105 as well as the rotational speed of internal combustion engine 101 oscillate after separating clutch 103 engages. However, it is not possible to efficiently compensate for these oscillations on the basis of a single fixed setpoint value.

SUMMARY

The present invention is based on the knowledge that in a hybrid drive having at least two drive sources, the rotational speed of the particular drive source may be advantageously regulated based on a variable which is a function of the rotational speeds of both units, for example based on a mean value between the rotational speeds of the two units. The quality of rotational speed regulation is thus improved, so that in particular a start phase of an internal combustion engine may be designed to be more comfortable. In addition, high torque deflections caused by the rotational speed regulator may be avoided, so that engaging an internal combustion engine may be achieved with fewer jerks.

According to one aspect, the present invention relates to a method for regulating rotational speed in a hybrid drive of a vehicle having a first drive source, for example an internal combustion engine, and a second drive source, for example an electric motor. The method includes determining a rotational speed variable which is a function of a rotational speed of the first drive source and of a rotational speed of the second drive source, and regulating a rotational speed of the first drive source and/or a rotational speed of the second drive source based on the rotational speed variable for reducing oscillation.

According to one specific embodiment, the rotational speed variable is a mean value, for example an arithmetic or a weighted mean value, between the rotational speed of the first drive source and the rotational speed of the second drive source. The rotational speed variable may thus be advantageously determined in a particularly simple manner.

According to one specific embodiment, the first drive source may be engaged with a drive train which is driven by the second drive source, for example with the aid of a separating clutch. The regulation of the rotational speed based on the rotational speed variable may therefore be carried out in particular when the first drive source is engaged with the drive train of the vehicle. This advantageously ensures that rotational speed oscillations occurring during the engagement operation may be quickly counteracted.

According to one specific embodiment, for determining the rotational speed variable the rotational speed of the first drive source is linked to a rotational inertia of the first drive source. Additionally or alternatively, for determining the rotational speed variable the rotational speed of the second drive source may be linked to a rotational inertia of the second drive source. The linkages may be weightings, for example, it being possible, for example, to weight the particular rotational speed values using a factor which refers to the particular rotational inertia. For this purpose, the rotational inertias of the drive source may be determined. For the oscillation reduction, inertia torques of the particular drive sources are thus also advantageously taken into account, thus allowing for an even more efficient oscillation reduction.

According to one specific embodiment, the regulation of the rotational speed is activated based on the rotational speed variable when the rotational speed of the first drive source is above or below the rotational speed of the second drive source. The regulation may be activated, for example, when the rotational speed curves of the two drive sources intersect. A simple criterion for activating the regulation may thus advantageously be used.

According to one specific embodiment, after the regulation of the rotational speed is completed based on the rotational speed variable, the rotational speed regulation may be carried out based on the rotational speed of the first drive source or of the second drive source. The rotational speed regulation concerns a regulation of the rotational speed of the first drive source and/or a regulation of the rotational speed of the second drive source. Thus, after the rotational speed oscillations are compensated for, a standard regulation method for regulating the rotational speed may be advantageously used.

According to one specific embodiment, the regulation of the rotational speed based on the rotational speed variable is carried out only up to a predetermined number of occasions of the rotational speed of the first drive source exceeding and/or falling below the rotational speed of the second drive source. This ensures that the method for reducing the rotational speed oscillations is used only in a targeted manner and for a limited period of time.

According to one specific embodiment, for regulating the rotational speed a difference between the rotational speed variable and a setpoint rotational speed is determined, so that the regulation may advantageously be carried out with the aid of standard regulation methods.

According to one specific embodiment, for activating the regulation based on the rotational speed variable, an oscillation of the rotational speed of the first drive source or of the rotational speed of the second drive source, for example a first occasion of the rotational speed of the first drive source exceeding or falling below the rotational speed of the second drive source, is detected. Relative oscillations of the rotational speeds of the two drive sources may thus be easily detected.

According to one aspect, the present invention relates to a programmed device, for example a control unit, which is designed to execute a computer program for carrying out the method for reducing rotational speed oscillations. The programmed device may be implemented in software or in hardware, for example.

Further exemplary embodiments of the present invention are explained with reference to the appended figures.

BRIEF DESCRIPTION OF THE DRAWINGS

FIG. 4 shows a mean value formation for determining a rotational speed variable.

FIG. 5 shows an implementation of the method for regulating rotational speed.

DETAILED DESCRIPTION

Figure 1:
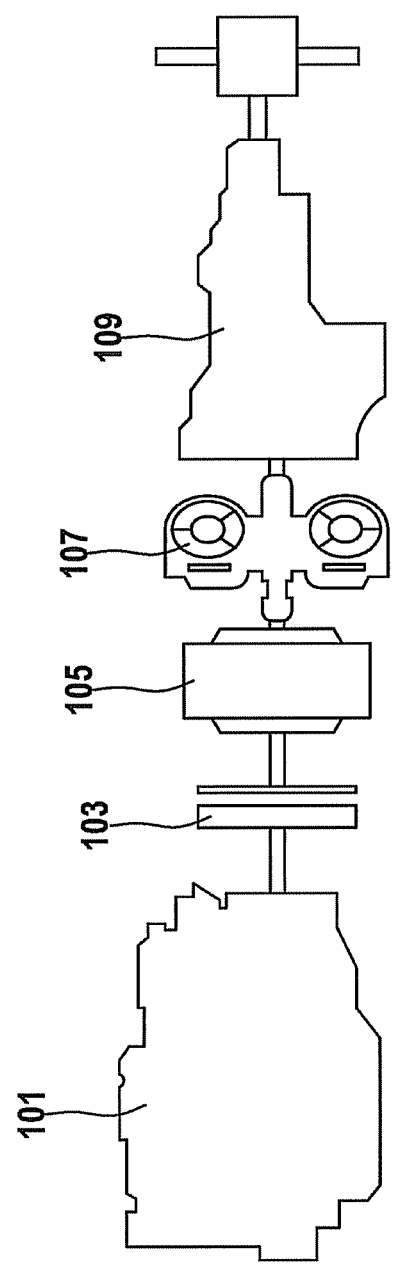
FIG. 1 shows a drive train of a hybrid vehicle.
Figure 2:
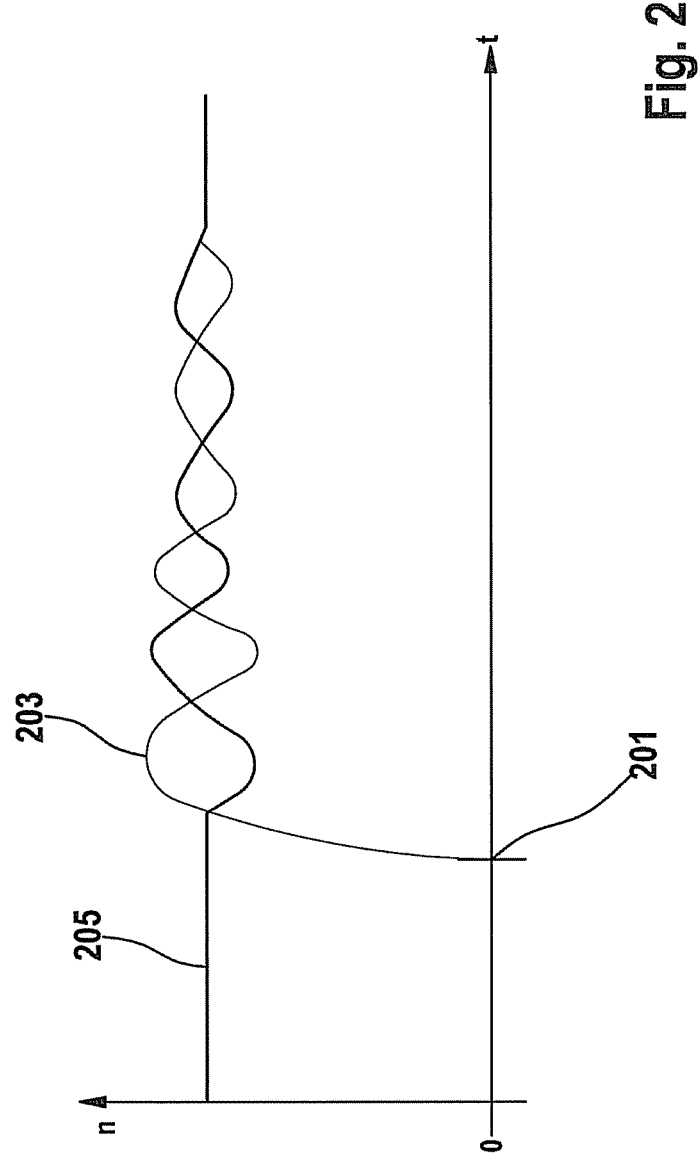
FIG. 2 shows a curve of rotational speed oscillations when a separating clutch is engaged.
Figure 3:
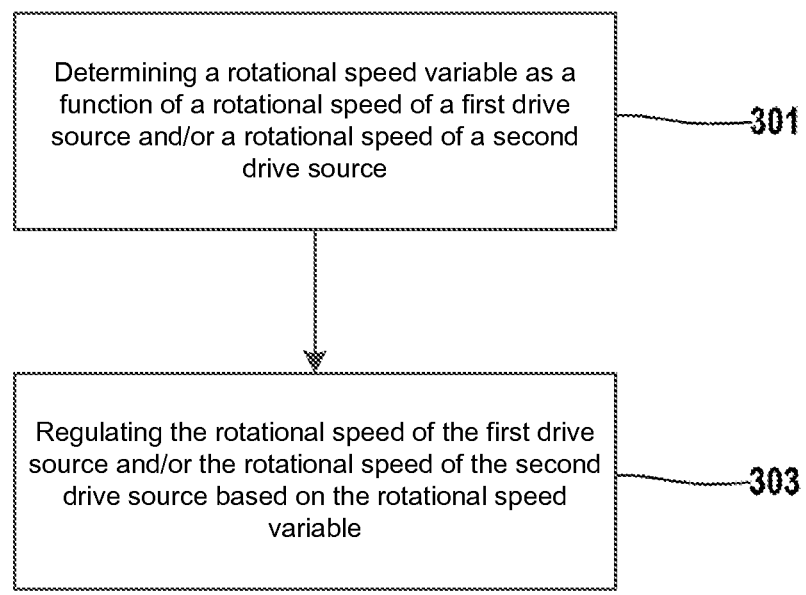
FIG. 3 shows a flow chart of a method for reducing oscillation.

FIG. 3 shows a sequence of a method for regulating rotational speed in a hybrid drive having a first drive source, for example an internal combustion engine, and a second drive source, for example an electric motor. The method includes step 301 of determining a rotational speed variable which is a function of a rotational speed of the first drive source and/or of a rotational speed of the second drive source, and step 303 of regulating the rotational speed of the first drive source and/or the rotational speed of the second drive source, based on the rotational speed variable.

For determining the rotational speed variable, for example a mean value between the rotational speed of the first drive source and the rotational speed of the second drive source may be formed. This mean value may preferably be used as an actual rotational speed value for the regulation. It is thus possible, for example, to suppress or even avoid the rotational speed oscillations which are caused by, e.g., a bow spring of the separating clutch. If the overall rotational speed level is too high or too low when the rotational speeds of the first drive source and of the second drive source are taken into account, the method may still intervene in a supporting manner and lower or raise the rotational speed level. High torque deflections of the rotational speed regulator which are caused by the rotational speed oscillations are avoided or reduced by using the rotational speed variable, thus increasing driving comfort.

The mean value formation may be activated in a targeted manner, for example, so that it does not have to operate continuously. One option for activating the mean value formation is to detect, for example, a first rotational speed intersection between the rotational speed of the first drive source, e.g., the internal combustion engine, and of the second drive source, e.g., the electric motor. A rotational speed intersection may be detected, for example, when a curve of the rotational speed of the first drive source intersects with a curve of the rotational speed of the second drive source, as shown, for example, in FIG. 4 on the basis of a curve 401 of the rotational speed of the internal combustion engine, a curve 403 of a rotational speed of an electric motor, and a curve 405 of a mean value over both rotational speed curves, which is used as an actual rotational speed for a regulator. Rotational speed intersections 407 illustrated in FIG. 4 may be used to provide a criterion for activating the mean value formation. The mean value formation may also remain active for a parameterizable number of rotational speed intersections 407, for example.

FIG. 5 illustrates an implementation of the rotational speed regulation in software or in hardware, in which a subtraction element 501 is supplied with a setpoint rotational speed via a first input 503 and is supplied with an actual rotational speed via a second input 505. A rotational speed difference is supplied to a rotational speed regulator 509 via an output 507 of subtraction element 501.

For determining the actual rotational speed, in addition a switching element 511 having a first input 513 and a second input 515 is provided. Inputs 513 and 515 are switchable to an output of switching element 511 as a function of a control signal 517. Thus, for example, on the one hand a value, which represents, for example, a rotational speed of the internal combustion engine or of the electric motor, may be applied at first input 513. On the other hand, the mean value between the rotational speeds of the electric motor and of the internal combustion engine may be applied at second input 515. If, for example, the rotational speed intersection illustrated in FIG. 4 is detected, the rotational speed mean value may be switched to the output of switching element 511 with the aid of control signal 517 and used as an actual rotational speed value. However, it is possible to generate control signal 517 for switching the rotational speed mean value to the output of switching element 511 after a predetermined number of oscillation amplitudes, so that overall a number of oscillation amplitudes may be set which is ignored by the regulation.

For computing the mean value, an arithmetic mean value according to formula $n_{mean} = (n_{EIM} n_{Eng})/2$, for example, may be determined. Referring to the variables, $n_{mean}$ stands for the rotational speed mean value, $n_{EIM}$ stands for the rotational speed of the electric motor, and $n_{Eng}$ stands for the rotational speed of the internal combustion engine. However, for very different rotational inertias of the two drive sources it is possible to take the particular rotational inertias into account in computing the mean value. This is particularly advantageous when the above-mentioned bow spring strongly excites both drive sources, so that the drive source having the smaller inertia undergoes larger oscillation amplitudes.

What is claimed is:

1. A method for regulating rotational speed in a hybrid drive of a vehicle having a first drive source and a second drive source, the method comprising:
   computing, by a control unit, a rotational speed variable as a function of (a) a rotational speed of the first drive source and (b) a rotational speed of the second drive source, wherein the rotational speed variable is an arithmetic or weighted mean of the rotational speed of the first drive source and the rotational speed of the second drive source; and regulating the rotational speed of the first drive source or the rotational speed of the second drive source based on the rotational speed variable in order to reduce oscillation.

2. The method of claim 1, wherein at least one of the first or second drive sources of the vehicle is an internal combustion engine.

3. The method of claim 1, wherein at least one of the first or second drive sources of the vehicle is an electric motor.

4. The method of claim 1, wherein the regulation of the rotational speed is carried out based on the rotational speed variable during engagement of the first drive source to a drive train of the vehicle driven by the second drive source.

5. The method of claim 1, wherein the regulation of the rotational speed is carried out based on the rotational speed variable during engagement, with the aid of a separating clutch, of the first drive source to a drive train of the vehicle driven by the second drive source.

6. The method of claim 1, wherein the regulation of the rotational speed is carried out based on the rotational speed variable during engagement of the first drive source to a drive train of the vehicle driven by the second drive source.

7. The method of claim 1, wherein, in the determination of the rotational speed variable, (a) the rotational speed of the first drive source is linked with a rotational inertia of the first drive source, or (b) the rotational speed of the second drive source is linked with a rotational inertia of the second drive source.

8. The method of claim 1, wherein, in the determination of the rotational speed variable, (a) the rotational speed of the first drive source is weighted with a rotational inertia of the first drive source, or (b) the rotational speed of the second drive source is weighted with a rotational inertia of the second drive source.

9. The method of claim 1, further comprising:
activating the regulation of the rotational speed when the rotational speed of the first drive source is above or below the rotational speed of the second drive source.

10. The method of claim 1, further comprising:
after completion of the regulation of the rotational speed based on the rotational speed variable, regulating the rotational speed based on (a) the rotational speed of the first drive source or (b) the rotational speed of the second drive source.

11. The method of claim 1, wherein the regulation of the rotational speed based on the rotational speed variable is performed up to a predetermined number of occurrences of the rotational speed of the first drive source exceeding and/or falling below the rotational speed of the second drive source.

12. The method of claim 1, further comprising:
determining, for the regulation of the rotational speed, a difference between the rotational speed variable and a setpoint rotational speed.

13. The method of claim 1, further comprising:
detecting, for activating the regulation based on the rotational speed variable, (a) an oscillation of the rotational speed of the first drive source or (b) an oscillation of the rotational speed of the second drive source.

14. The method of claim 1, further comprising:
detecting, for activating the regulation based on the rotational speed variable, a first occurrence of the rotational speed of the first drive source exceeding or falling below the rotational speed of the second drive source.

15. A vehicle control device, comprising:
a processor; and
a non-transitory computer-readable storage medium having a computer program, which is executable by the processor for regulating rotational speed in a hybrid drive of a vehicle having a first drive source and a second drive source, by performing the following:
computing a rotational speed variable as a function of (a) a rotational speed of the first drive source and (b) a rotational speed of the second drive source, wherein the rotational speed variable is an arithmetic or weighted mean of the rotational speed of the first drive source and the rotational speed of the second drive source; and
regulating the rotational speed of the first drive source or the rotational speed of the second drive source based on the rotational speed variable in order to reduce oscillation.

16. The vehicle control device of claim 15, wherein at least one of the first or second drive sources of the vehicle is an internal combustion engine.

17. The vehicle control device of claim 15, wherein at least one of the first or second drive sources of the vehicle is an electric motor.

18. The method of claim 1, further comprising:
providing the rotational speed variable as an input to a switching unit of a regulation device.

19. The vehicle control device of claim 15, wherein the rotational speed variable is provided as an input to a switching unit of a regulation device.

20. The method of claim 1, further comprising:
detecting an intersection of a value of the rotational speed of the first drive source with a value of the rotational speed of the second drive source;
wherein the regulating of the rotational speed of the first drive source or the rotational speed of the second drive source based on the rotational speed variable is performed in response to the detecting.

21. The method of claim 20, further comprising:
detecting a predetermined number of intersections of the value of the rotational speed of the first drive source with the value of the rotational speed of the second drive source; and
stopping the regulating of the rotational speed of the first drive source or the rotational speed of the second drive source based on the rotational speed variable in response to the detecting.

22. The method of claim 1, further comprising:
detecting a predetermined number of intersections of a value of the rotational speed of the first drive source with a value of the rotational speed of the second drive source;
wherein the regulating of the rotational speed of the first drive source or the rotational speed of the second drive source based on the rotational speed variable is performed in response to the detecting.

23. The method of claim 1, wherein the computing computes the rotational speed variable as a function of a rotational inertia of the first drive source.

24. The method of claim 23, wherein the computing computes the rotational speed variable as a function of a rotational inertia of the second drive source.

25. The method of claim 1, wherein the regulating regulates the rotational speed of the first drive source or the rotational speed of the second drive source to a rotational speed equal to the computed rotational speed variable.

* * * * *